(12) United States Patent
Mancini et al.

(10) Patent No.: US 9,238,955 B2
(45) Date of Patent: Jan. 19, 2016

(54) SYSTEM AND METHOD FOR SUBSEA STRUCTURE OBSTRUCTION REMEDIATION USING AN EXOTHERMIC CHEMICAL REACTION

(71) Applicants: Christopher Mancini, Magnolia, TX (US); Nathaniel Dieringer, Cypress, TX (US)

(72) Inventors: Christopher Mancini, Magnolia, TX (US); Nathaniel Dieringer, Cypress, TX (US)

(73) Assignee: Oceaneering International, Inc., Houston, TX (US)

( * ) Notice: Subject to any disclaimer, the term of this patent is extended or adjusted under 35 U.S.C. 154(b) by 0 days.

(21) Appl. No.: 14/262,568

(22) Filed: Apr. 25, 2014

(65) Prior Publication Data

US 2014/0318798 A1    Oct. 30, 2014

Related U.S. Application Data

(60) Provisional application No. 61/817,245, filed on Apr. 29, 2013.

(51) Int. Cl.
*C09K 8/524*    (2006.01)
*E21B 36/00*    (2006.01)
*E21B 29/12*    (2006.01)

(52) U.S. Cl.
CPC .............. *E21B 36/008* (2013.01); *C09K 8/524* (2013.01); *E21B 29/12* (2013.01); *C09K 2208/22* (2013.01)

(58) Field of Classification Search
None
See application file for complete search history.

(56) References Cited

U.S. PATENT DOCUMENTS

| | | | |
|---|---|---|---|
| 3,153,578 A * | 10/1964 | Taylor | B01J 19/26 137/897 |
| 4,755,230 A | 7/1988 | Ashton et al. | |
| 4,928,759 A | 5/1990 | Siegfried, II et al. | |
| 6,756,021 B2 * | 6/2004 | Botrel | B08B 7/0071 422/184.1 |
| 6,939,082 B1 * | 9/2005 | Baugh | B08B 7/0071 138/32 |
| 7,036,596 B2 * | 5/2006 | Reid | E21B 36/005 165/104.21 |
| 7,669,659 B1 | 3/2010 | Lugo | |
| 8,424,608 B1 * | 4/2013 | Lugo et al. | 166/357 |
| 2010/0139924 A1 * | 6/2010 | Abney | 166/335 |
| 2012/0181043 A1 | 7/2012 | Patel | |

* cited by examiner

*Primary Examiner* — Matthew R Buck
*Assistant Examiner* — Douglas S Wood
(74) *Attorney, Agent, or Firm* — Maze IP Law, PC (57) ABSTRACT

Systems and methods comprise structures and methods for using a plurality of chemicals which are mixed subsea, resulting in a heated fluid which can be delivered by various means to an area about a subsea structure such as a pipe or other structure which has been compromised by a plug such as a solid gas hydrate or paraffinic plug. Various embodiments allow for selective use of insulated chambers and baffled conduits and the like, or combinations thereof, to aid in the mixing of the various chemicals and achieving a desired temperature.

29 Claims, 8 Drawing Sheets

SYSTEM AND METHOD FOR SUBSEA STRUCTURE OBSTRUCTION REMEDIATION USING AN EXOTHERMIC CHEMICAL REACTION

RELATION TO PRIORITY

This application claims the benefit of Provisional Application 61/817,245 for "Hydrate Remediation Using Exothermic Chemical Reaction," filed Apr. 29, 2013.

FIELD OF THE INVENTION

The following inventions generally relate to methods and apparatuses which can be used to remove a plug that is present within a subsea structure such as a production system pipeline, riser, subsea well equipment, or the like. These plugs are generally solid gas hydrates or paraffinic in nature and are generally formed by operating the production system at temperature and pressure levels conducive to formation of solid wax or hydrate crystals within the produced fluid stream. The solid crystals agglomerate within the structure, eventually blocking, or significantly curtailing, the production flow from the subsea well, resulting in loss of revenue from the subsea production facility.

In addition, hydrate masses may form around subsea well equipment due to gas sublimation from shallow sub-surface methane hydrate deposits that are locally heated by the well in production. This free gas is trapped and re-forms into solid hydrate masses within the external confines of the subsea equipment packages, blocking service access to the equipment, and interfering with mechanical operation of critical external moving parts.

In general, a solid hydrate or paraffin plug can be removed by adding enough heat to the plug to change the physical state of the plug material into a transportable fluid, e.g. a liquid or a gas.

FIGURES

The figures supplied herein disclose various embodiments of the claimed invention.

DESCRIPTION OF VARIOUS EMBODIMENTS

In all of these methods and apparatuses, subsea structures 200, 201 may comprise production piping, a structure such as a subsea piece of equipment, or the like; the obstruction may comprise an internal plug or external mass comprising a hydrate or paraffin or the like or a combination thereof; and the two chemical reactants typically comprise ammonium chloride $NH_4Cl$ and sodium nitrite $NaNO_2$. By way of example and not limitation, other chemicals that can be used include hydrochloric acid (HCl) and ammonium hydroxide ($NH_4OH$); hydrochloric acid (HCl) and sodium hydroxide (NaOH); hydrogen peroxide ($H_2O_2$) and a solution containing metal ions; and the like; or a combination thereof.

Figure 1:
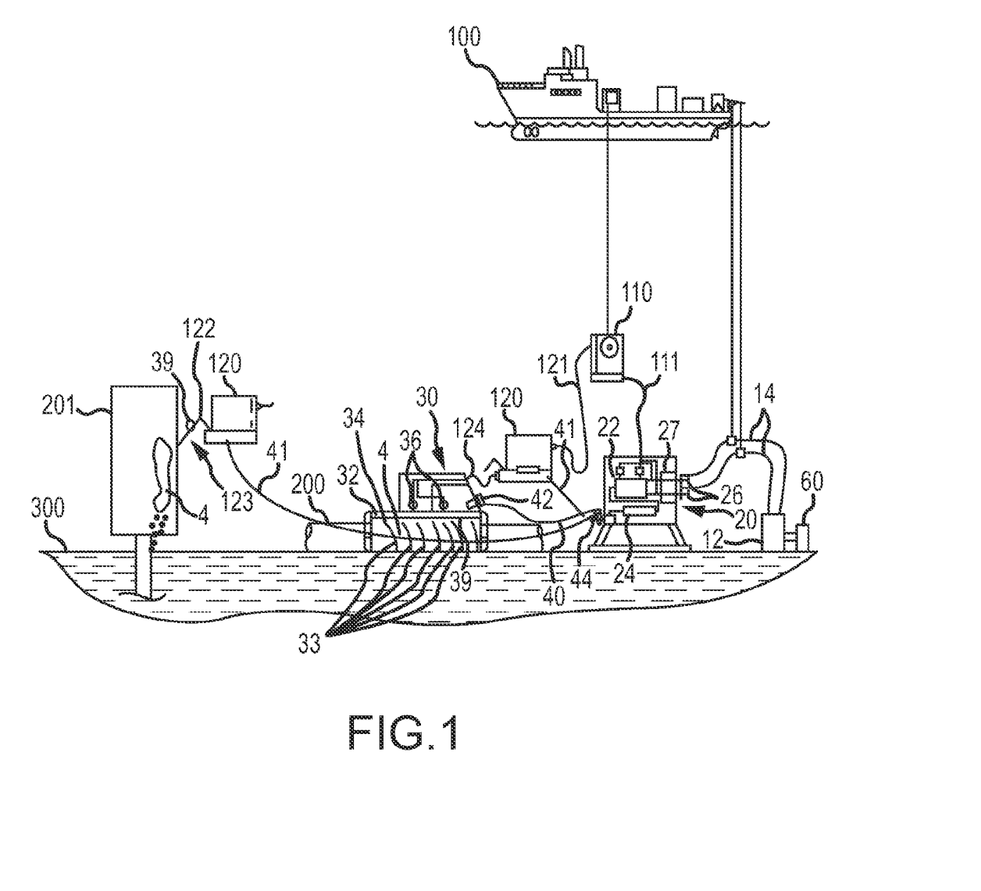
FIG. 1 is a view of an exemplary system in partial perspective of various alternative embodiments.

Referring generally to FIG. 1, in an embodiment system 1 for providing a hot fluid to subsea structures 200 and/or 201 comprises a plurality of reservoirs 12, located subsea, adapted to contain chemical reactants; reaction chamber 22; a corresponding plurality of chemical reactant fluid conduits 14 providing fluid pathways between a corresponding one of the plurality of reservoirs 12 and reaction chamber 22; insulated chamber 32 adapted to surround an area of a subsea structure 200 containing obstruction 4; and one or more hot fluid conduits 24 in fluid communication with reaction chamber 22 and insulated chamber 32, these hot fluid conduits 24 comprising one or more internal baffles designed to blend the chemical reactants. Additional hot fluid conduits 40 may provide a further fluid pathway between hot fluid conduits 24 and insulated chamber 32.

Insulated chamber 32 may comprise a selectively releasable insulated chamber adapted to selectively disengage from subsea structure 200, such as skid 37 or clampable structure.

Figure 2:
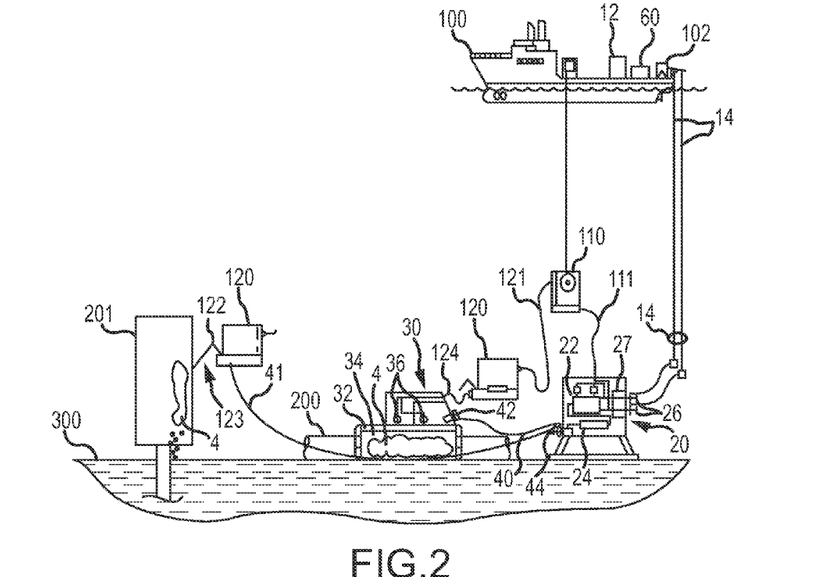
FIG. 2 is a view of an exemplary system in partial perspective and various alternative embodiments.

In a further embodiment, referring generally to FIG. 2, system 1 for providing a hot fluid subsea comprises a plurality of reservoirs 12, located on or at vessel 100, adapted to contain chemical reactants; reaction chamber 22; a corresponding plurality of chemical reactant fluid conduits 14 providing fluid pathways between a corresponding one of the plurality of reservoirs 12 and reaction chamber 32; one or more heater tubes 33 pre-installed and wrapped around an area of subsea structures 200 or 201 containing obstruction 4; and one or more hot fluid conduits 24 in fluid communication with reaction chamber 32 and heater tubes 33. Hot fluid conduits 24 comprise one or more internal baffles designed to blend the chemical reactants as they are in and pass through hot fluid conduits 24. Additional hot fluid conduits 40 may provide a further fluid pathway between hot fluid conduits 24 and insulated chamber 32.

Referring to either FIG. 1 or FIG. 2, in a further embodiment, system 1 comprises a plurality of reservoirs 12 adapted to contain chemical reactants; reaction chamber 22; a corresponding plurality of chemical reactant fluid conduits 14 providing fluid pathways between a corresponding one of the plurality of reservoirs 12 and reaction chamber 22; and one or more hot fluid delivery conduits 24, comprising one or more internal baffles adapted to blend the chemical reactants, in fluid communication with reaction chamber 22. Reservoirs 12 may be located subsea 300, on or at vessel 100, or a combination thereof.

In these embodiments, additional hot fluid delivery conduits 41 are adapted to be manipulated by and connectable to remotely operated vehicle (ROV) 120. ROV 120 may be controlled by ROV cage 110 such as via umbilical 121.

Figure 3:
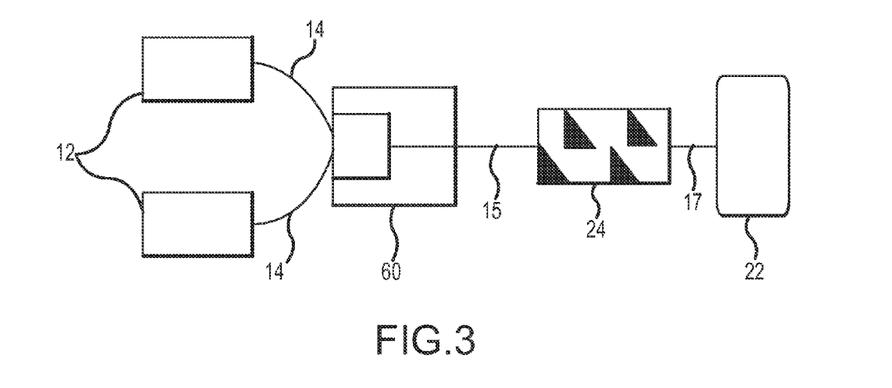
FIG. 3 is a view of an exemplary system in partial perspective and various alternative embodiments.
Figure 4:
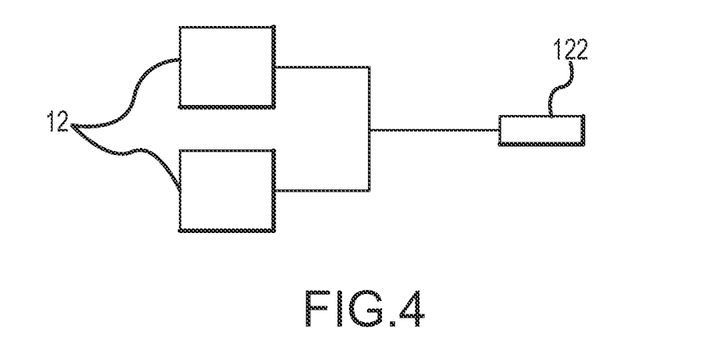
FIGS. 4-11 are schematic views of an exemplary system and various alternative embodiments.

Referring now generally to FIG. 3, in a further embodiment, system 2 for providing a hot fluid subsea comprises a plurality of reservoirs 12 adapted to contain chemical reactants; one or more manifolds 60 disposed downstream from the plurality of reservoirs 12; a corresponding plurality of chemical reactant fluid conduits 14 providing fluid pathways between a corresponding one of the plurality of reservoirs 12 and manifold 60; baffled mixing conduit 24 in fluid communication with and located downstream from manifold 60, where baffled mixing conduit 24 is adapted to mix fluid entering into baffled mixing conduit 24 inside baffled mixing conduit 24 via its baffles; one or more mixing fluid supply conduits 15 in fluid communication with manifold 60 and baffled mixing conduit 24; reaction chamber 22 in fluid communication with and located downstream from baffled mixing conduit 24; and one or more hot fluid conduits 15 in fluid communication with reaction chamber 22. As with the other configurations, hot fluid may exit reaction chamber 22 in many ways such as via hot fluid conduits 40 (FIG. 1) which may provide a further fluid pathway between reaction chamber 22 and insulated chamber 32 and/or via hot fluid delivery conduits 41 (FIG. 1) adapted to be manipulated by and connectable to ROV 120.

It will be appreciated by those of ordinary skill in these arts that manifold 60 could comprise two pieces of tubing and a t-fitting as well as equivalent structures.

Figure 5:
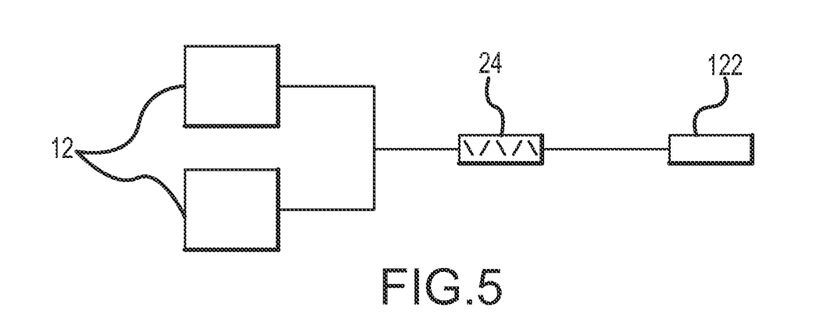
Figure 6:
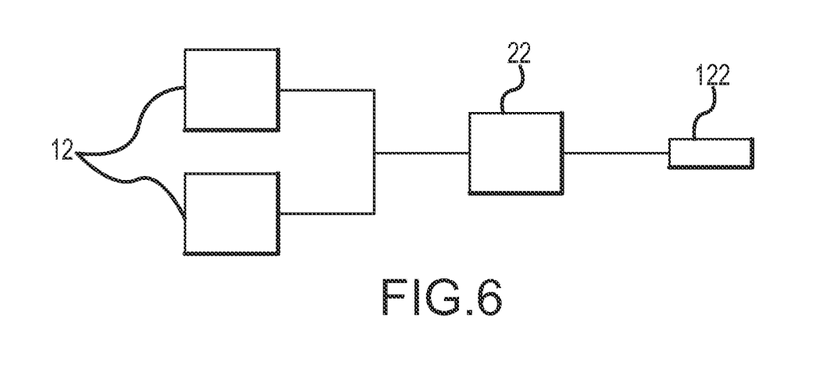
Figure 7:
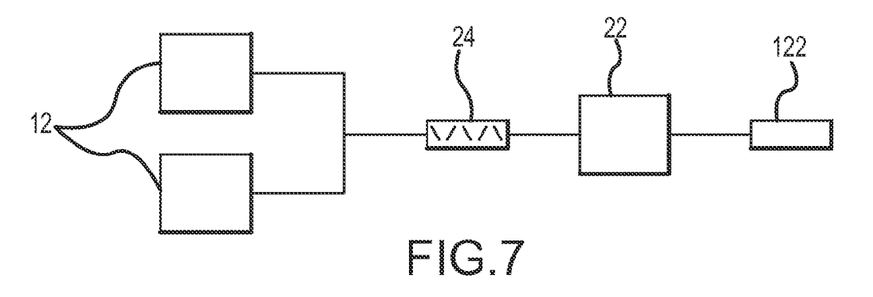
Figure 8:
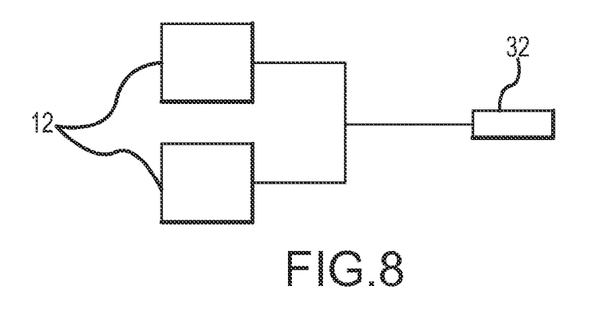

As illustrated by FIGS. 4-7, various other embodiments may exist. By way of example and not limitation, a simple system may comprise reservoirs 12 connected by fluid conduits 41 to wand 122 (FIG. 4) which can be maneuvered and manipulated by ROV 120 (FIG. 1) to deliver a stream of hot fluid 123 to an area near obstruction 4. In a further embodiment, baffled chamber 24 may be disposed in-between reservoirs 12 and wand 122, where all components are in fluid communication as indicated (FIG. 5). In a further embodiment, reaction chamber 22 may be disposed in-between reservoirs 12 and wand 122, where all components are in fluid communication as indicated (FIG. 6). In a further embodiment, baffled chamber 24 may be disposed upstream from reaction chamber 22, in-between reservoirs 12 and reaction chamber 22, and reaction chamber 22 disposed upstream from and connected to wand 122, where all components are in fluid communication as indicated (FIG. 7). In any of these embodiments, reservoirs 12 may be located on supporting vessel 100, subsea 300, or the like, or a combination thereof.

Figure 9:
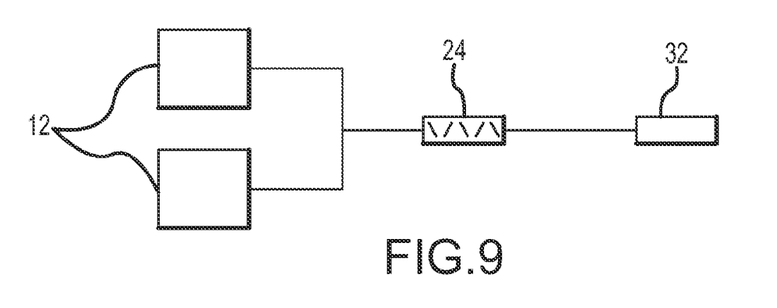
Figure 10:
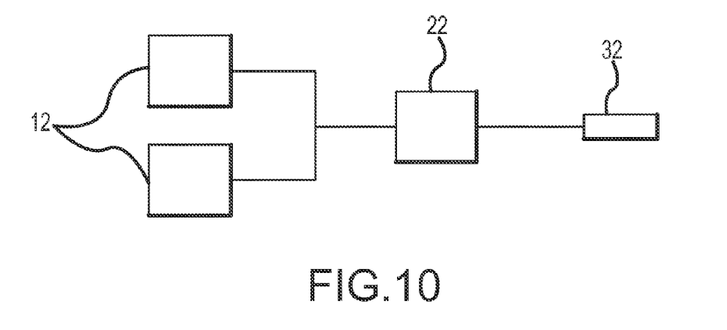
Figure 11:
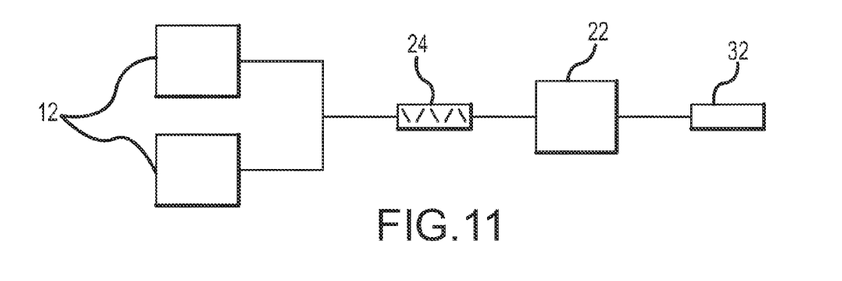

As illustrated by FIGS. 8-11, additional other embodiments may exist. By way of example and not limitation, a simple system (FIG. 8) may comprise reservoirs 12 connected by fluid conduits 14 to insulated chamber 32 which, as discussed above, may be skid 37 (FIG. 14), a selectively engaged/disengaged insulated chamber 32 (FIG. 1), or a set of preinstalled fluid coils and/or heater tubes 33 (FIG. 1) disposed about the area with obstruction 4. In a further embodiment, baffled chamber 24 may be disposed in-between reservoirs 12 and insulated chamber 32, where all components are in fluid communication as indicated (FIG. 9). In a further embodiment, reaction chamber 22 may be disposed in-between reservoirs 12 and insulated chamber 32, where all components are in fluid communication as indicated (FIG. 10). In a further embodiment, baffled chamber 24 may be disposed upstream from reaction chamber 22, in-between reservoirs 12 and reaction chamber 22, and reaction chamber 22 disposed upstream from and connected to insulated chamber 32, where all components are in fluid communication as indicated (FIG. 11). In any of these embodiments, reservoirs 12 may be located on or at supporting vessel 100, subsea 300, or the like, or a combination thereof. If located on or at supporting vessel 100, weights 35 (FIGS. 13-14) may be provided to aid with keeping conduits 14 in place.

In any of these embodiments reaction chamber 22 (FIG. 1) may be adapted to maintain mixed reactant fluid for a predetermined period of time such as, by way of example and not limitation, around one minute to around one and a half minutes or more while the reaction takes place and the fluid heats up to a desired temperature.

In any of these embodiments at least one of chemical reactant fluid conduits 14 may comprise coiled tubing.

In any of these embodiments pump 50, which may be a low pressure pump, may be present and in fluid communication with at least one of reservoirs 12, where pump 50 may be adapted to pump a chemical fluid from reservoir 12 with which it is in fluid communication at a predetermined constant or variable rate into a corresponding conduit 14 in fluid communication with manifold 60 (FIG. 3). Pump 50 may be in fluid communication with the hot fluid and adapted to mix ambient seawater into the hot fluid.

In any of these embodiments temperature sensor 39 (FIG. 1) may be present and operatively in communication with reaction chamber 22. Temperature sensor 39 may be operatively in communication with an external delivery point for the heated fluid, e.g. wand 122 (FIG. 1), either in conjunction with or independently of reaction chamber 22.

In any of these embodiments one or more first flow restrictors 26 (FIG. 1) may be provided and adapted to be in fluid communication with the corresponding plurality of chemical reactant fluid conduits 14, where flow restrictor 26 is adapted to adjust flow rates of the reactants delivered to reaction chamber 22.

In any of these embodiments one or more flow diverters 42 may be present and in fluid communication with hot fluid conduits 40 and adapted to selectively divert the flow of heated fluid away from subsea structure 200.

In any of these embodiments controllable valve 44, which may be remotely controllable, may be present and in fluid communication with the hot fluid conduit, where controllable valve 44 adapted to shut off flow of the heated fluid from reaction chamber 22 (FIG. 1).

Figure 12:
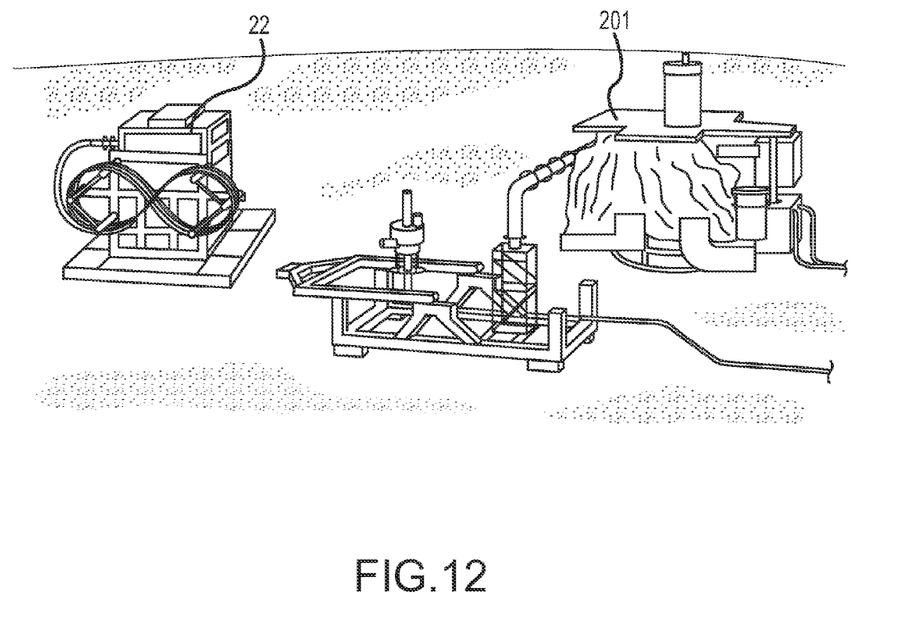
FIG. 12 is a view in partial perspective of a subsea environment.
Figure 13:
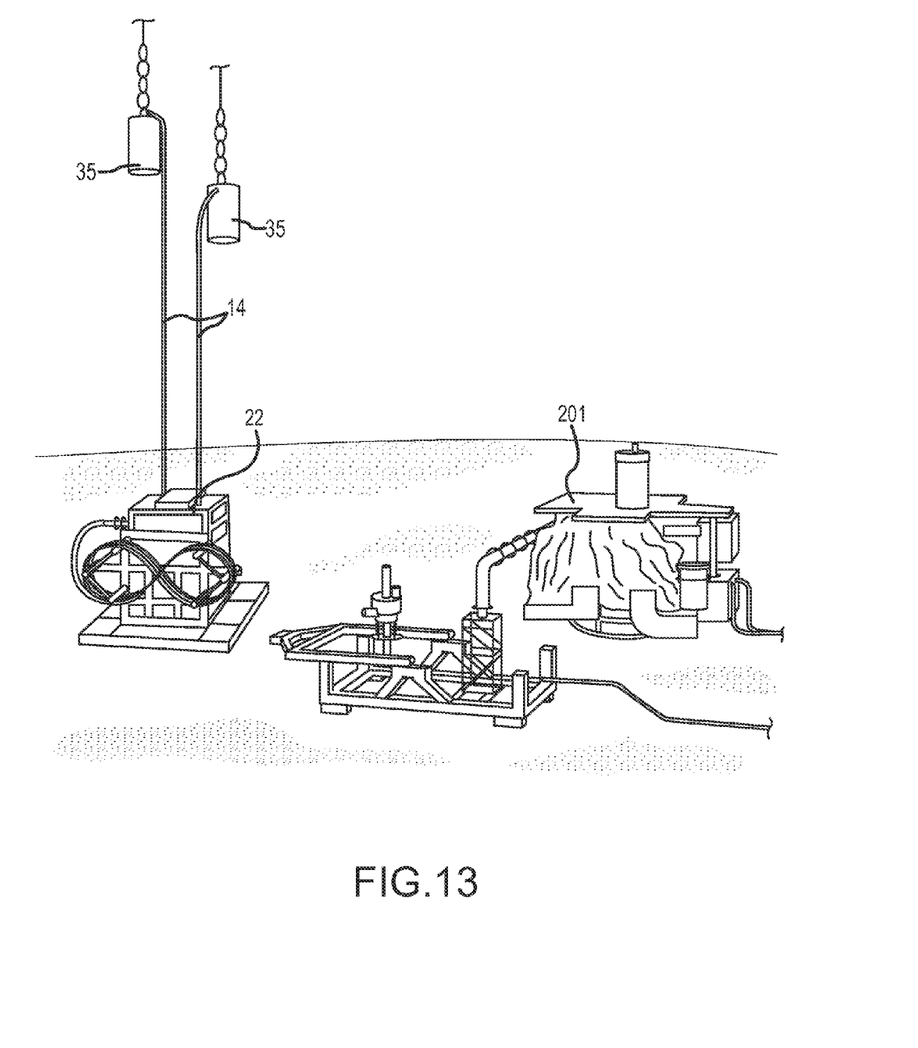
FIG. 13 is a view in partial perspective of a subsea environment showing reservoirs being lowered into that environment.
Figure 14:
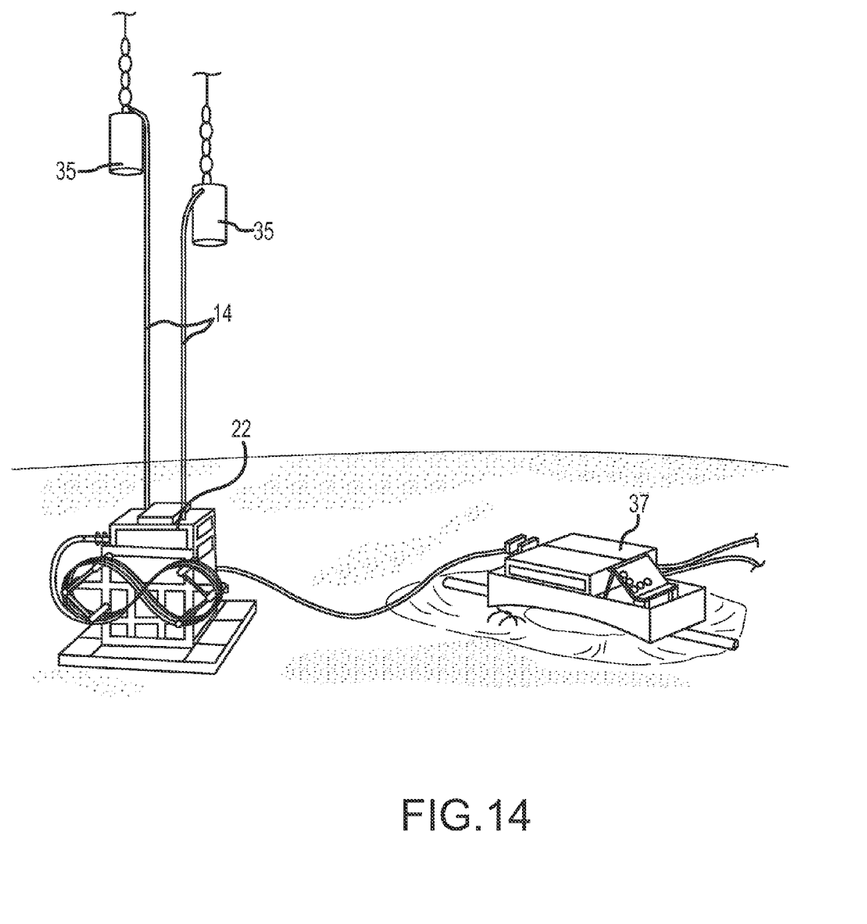
FIG. 14 is a view in partial perspective of a subsea environment showing fluids from the reservoirs being introduced into that environment via a skid.

In the operation of exemplary embodiments, referring generally to FIGS. 12-14, in a first method obstruction 4 (FIG. 1) such as a hydrate or paraffin plug, may be removed from structure subsea 200 or 201 (FIG. 1) by selectively combining two or more chemical reactants obtained from two chemical reactant reservoirs 12 (FIG. 1) in reaction chamber 22 (FIG. 1) to create a hot fluid by an exothermic chemical reaction between the two chemical reactants. In this first method, reaction chamber 22 is disposed subsea, preferably proximate subsea structure 200. The resultant hot fluid is then routed through one or more fluid conduits 24 (FIG. 1) which comprise one or more internal baffles adapted to thoroughly blend the reactants, and then to insulated chamber 32 (FIG. 1) which surrounds an area of subsea structure 200 containing obstruction 4. The hot fluids may be routed via conduits 40 from fluid conduits 24 to insulated chamber 32. Once present at that area, the area around obstruction 4 is heated with the hot fluid.

As described above, reservoirs 12 (FIG. 1) may comprise fluid reservoirs located proximate seabed 300 (FIG. 1) and/or fluid reservoirs located on or at supporting vessel 100 (FIG. 1). The chemical reactants comprise fluids which delivered to reaction chamber 22 (FIG. 1), typically via separate coiled tubing strings 14 (FIG. 1).

In a further embodiment, obstruction 4 may be removed from structure 200 (FIG. 1) by selectively combining two or more chemical reactants obtained from a corresponding set of chemical reactant reservoirs 12 (FIG. 1) in reaction chamber 22 (FIG. 1) to create a hot fluid by an exothermic chemical reaction between the two chemical reactants. Once combined, the resultant hot fluid is routed through a pre-installed heater tube 33 (FIG. 1) wrapped around an area of structure 200 (FIG. 1) containing obstruction 4 and that area heated with the hot fluid.

In a further embodiment, obstruction 4 may be removed from structure 201 (FIG. 1) by selectively combining two or more chemical reactants obtained from a corresponding set of chemical reactant reservoirs 12 (FIG. 1) in reaction chamber 22 (FIG. 1) to create a hot fluid by an exothermic chemical reaction between the two chemical reactants. The resultant hot fluid may then be routed through an ROV-deployed heating wand 122 (FIG. 1) and a stream of hot fluid 123 (FIG. 1) directed at an area where obstruction 4 is present, such as an external mass, and the area around the obstruction heated with the hot fluid.

In a further embodiment, obstruction 4 (FIG. 3) may be removed from structure 200 (FIG. 3) by selectively combining two or more chemical reactants obtained from a corresponding set of chemical reactant reservoirs 12 (FIG. 3) in manifold 60 (FIG. 3). The chemical reactants are then routed from manifold 60 through one or more fluid conduits 15 (FIG. 3) to baffled mixing chamber 24 (FIG. 3) which has been adapted to blend the reactants. This mixed fluid is then routed into reaction chamber 22 (FIG. 3) for a predetermined amount of time, by way of example and not limitation of around one minute to around one and a half minutes or more, to create a hot fluid by an exothermic chemical reaction between the chemical reactants. Once heated to the required temperature, the heated fluid is then routed through one or more heated fluid conduits 40 (FIG. 3) to an area of structure 200 (FIG. 3) proximate obstruction 4 and that area heated with the hot fluid.

In certain embodiments, one or more of the chemical reactant reservoirs 12 (FIG. 1) may be in fluid communication with controllable pump 50 (FIG. 1) which pumps its respective chemicals at predetermined varying rates.

In any of these methods, reservoirs 12 (FIG. 1) may be located proximate seabed 300 (FIG. 1), on or at supporting vessel 100 (FIG. 1), or the like, or a combination thereof. If fluid reservoirs 12 are located on supporting vessel 100, the chemical reactants may comprise fluids delivered to reaction chamber 22 (FIG. 1) via separate coiled tubing strings 14 (FIG. 1).

As also described above, reaction chamber 22 (FIG. 1) may be disposed proximate subsea structure 200 or 201 (FIG. 1).

Oilfield production systems often use composite thermoplastic flexible pipes, and external thermoplastic or synthetic rubber insulation is used on steel pipes. These materials have an external temperature limit, and systems 1 (FIG. 1) or 2 (FIG. 3) may further comprise one or more temperature sensors 39 (FIG. 1) disposed at or near one or more predetermined positions with respect to reaction chamber 22 (FIG. 1), e.g. at reaction chamber 22, external delivery point(s) for the heated fluid such as 123 (FIG. 1), or the like, or a combination thereof. The temperature of the hot fluid can then be controlled using feedback from temperature sensors 39 (FIG. 1). In all of these methods, controlling the temperature may comprise optimizing an aqueous concentration of the stored reactants; adjusting a bulk flowrate of the reactants delivered to reaction chamber 22; adjusting a ratio of the reactants delivered to reaction chamber 22 to achieve a desired temperature; mixing ambient seawater into the hot fluid using pump 50 (FIG. 1), which may be a low pressure pump, in fluid communication with the hot fluid; diverting the flow of heated fluid away from subsea structures 200 or 201 (FIG. 1); shutting off flow of the heated fluid from reaction chamber 22 using controllable valve 44 (FIG. 1); releasing insulated chamber 32 (FIG. 1) from around subsea structure 200 to allow heated fluid to simply escape into the environment; or the like; or a combination thereof. These controls may be manual and/or automated with software and sensors such as temperature sensor 39.

In all of these methods, once the reactants are combined in reaction chamber 22 (FIG. 1), at some point the fluid mixture travels through conduits 24 (FIG. 1) which comprise one or more internal baffles which are designed to blend the reactants, typically thoroughly, and may comprise steel.

One of ordinary skill in these arts will realize that FIGS. 1 and 2, while illustrating different embodiments, having many components in common and that reference elements present in FIG. 1 above, may also apply to the same corresponding elements in FIG. 2.

The foregoing disclosure and description of the invention is illustrative and explanatory. Various changes in the size, shape, and materials, as well as in the details of the illustrative construction and/or an illustrative method may be made without departing from the spirit of the invention.

We claim:

1. A system for providing a hot fluid subsea, comprising:
   a. a plurality of reservoirs adapted to contain a corresponding plurality of chemical reactants;
   b. a reaction chamber;
   c. a plurality of chemical reactant fluid conduits, each fluid conduit providing a fluid pathway between a corresponding one of the plurality of reservoirs and the reaction chamber;
   d. an insulated chamber adapted to be placed in close proximity to an area of a subsea structure containing an obstruction; and
   e. a hot fluid conduit in fluid communication with the reaction chamber and the insulated chamber, the hot fluid conduit comprising an internal baffle adapted to blend the chemical reactants within the hot fluid conduit, the hot fluid conduit comprising a fluid exit portal.

2. The system of claim 1, further comprising a temperature sensor operatively in communication with the reaction chamber.

3. The system of claim 1, further comprising a temperature sensor operatively in communication with an external delivery point in fluid communication with the fluid exit portal.

4. The system of claim 1, further comprising a flow restrictor in fluid communication with the plurality of chemical reactant fluid conduits and the reaction chamber, the flow restrictor adapted to adjust flow rates of the reactants delivered to the reaction chamber.

5. The system of claim 1, further comprising a low pressure pump in fluid communication with the hot fluid conduit, the low pressure pump adapted to mix ambient seawater into the hot fluid.

6. The system of claim 1, further comprising a flow diverter in fluid communication with the hot fluid conduit, the flow diverter adapted to selectively divert the flow of heated fluid away from the subsea structure towards which the hot fluid exiting the fluid exit portal is directed.

7. The system of claim 1, further comprising a controllable valve in fluid communication with the hot fluid conduit, the controllable valve adapted to shut off flow of the heated fluid from the reaction chamber.

8. The system of claim 7, wherein the controllable valve comprises a remotely controllable valve.

9. The system of claim 1, wherein the insulated chamber is adapted to substantially surround the area of the subsea structure containing an obstruction.

10. The system of claim 9, wherein the insulated chamber comprises a selectively releasable insulated chamber adapted to selectively engage and disengage from the subsea structure.

11. The system of claim 1, wherein the insulated chamber comprises a remotely operated vehicle compatible skid.

12. A method of removing an obstruction from a structure subsea, comprising:
   a. selectively combining a plurality of chemical reactants obtained from a corresponding plurality of chemical reactant reservoirs in a reaction chamber to create a fluid heated to a predetermined temperature range by an exothermic chemical reaction between the plurality of chemical reactants;

b. routing the hot fluid through a fluid conduit to an insulated chamber disposed proximate an area of a subsea structure containing an obstruction, the fluid conduit comprising an internal baffle adapted to blend the chemical reactants; and c. heating the area around the obstruction with the heated fluid.

13. The method of claim 12, wherein the chemical reactants comprise ammonium chloride ($NH_4Cl$) and sodium nitrite ($NaNO_2$); hydrochloric acid (HCl) and ammonium hydroxide ($NH_4OH$); hydrochloric acid (HCl) and sodium hydroxide (NaOH); or hydrogen peroxide ($H_2O_2$) and a solution containing metal ions.

14. The method of claim 12, wherein the reservoirs comprise fluid reservoirs located proximate the seabed.

15. The method of claim 12, wherein:
a. the reservoirs comprise fluid reservoirs located on a supporting vessel; and
b. the chemical reactants comprise fluids delivered to the reaction chamber via separate coiled tubing strings.

16. The method of claim 12, wherein the reaction chamber is disposed proximate the subsea structure.

17. The method of claim 12, wherein the subsea structure comprises production piping.

18. The method of claim 12, wherein the obstruction comprises a plug.

19. The method of claim 18, wherein the plug comprises at least one of a hydrate or paraffin.

20. The method of claim 12, wherein disposing the insulated chamber proximate an area of a subsea structure containing an obstruction comprises substantially surrounding the area.

21. The method of claim 20, wherein substantially surrounding the area comprises:
a. engaging a selectively engageable insulated chamber about the area prior to providing the hot fluid to the insulated chamber; and
b. disengaging the selectively engageable insulated chamber from the area after a predetermined amount of time.

22. The method of claim 12, further comprising:
a. disposing a temperature sensor at a predetermined position with respect to the reaction chamber; and
b. controlling the temperature of the hot fluid using feedback from the temperature sensor.

23. The method of claim 22, wherein controlling the temperature comprises initially optimizing an aqueous concentration of the stored reactants.

24. The method of claim 22, wherein controlling the temperature comprises adjusting a bulk flow rate of the reactants delivered to the reaction chamber.

25. The method of claim 22, wherein controlling the temperature comprises adjusting a ratio of the reactants delivered to the reaction chamber to achieve a desired temperature.

26. The method of claim 22, wherein controlling the temperature comprises mixing ambient seawater into the hot fluid using a low pressure pump in fluid communication with the hot fluid.

27. The method of claim 22, wherein controlling the temperature comprises diverting the flow of heated fluid away from the piping system to be protected.

28. The method of claim 22, wherein controlling the temperature comprises shutting off flow of the heated fluid from the reaction chamber using a controllable valve.

29. The method of claim 22, wherein controlling the temperature comprises releasing the insulated chamber from around the pipe to allow heated fluid to simply escape into the environment.

* * * * *